J. SIMON.
ANTISKIDDING ATTACHMENT FOR TIRE CHAINS.
APPLICATION FILED AUG. 12, 1921.

1,407,227. Patented Feb. 21, 1922.

Inventor
Joseph Simon
By William Clinton
Attorney

UNITED STATES PATENT OFFICE.

JOSEPH SIMON, OF HALIFAX, NOVA SCOTIA, CANADA.

ANTISKIDDING ATTACHMENT FOR TIRE CHAINS.

1,407,227.  Specification of Letters Patent.  Patented Feb. 21, 1922.

Application filed August 12, 1921. Serial No. 491,796.

*To all whom it may concern:*

Be it known that I, JOSEPH SIMON, a subject of the King of Great Britain, residing at Halifax, Province of Nova Scotia, Canada, have invented certain new and useful Improvements in Antiskidding Attachments for Tire Chains; and I do hereby declare that the following is a full, clear, and exact description of the invention, such as will enable others skilled in the art to which it appertains to make and use the same.

The present invention relates to new and useful improvements in anti-skidding attachments for tire chains of automobiles and the like.

The primary object of the invention is the provision of a tire chain such as above referred to, which has novel anti-skidding attachments arranged to grip the roadway to prevent the machine to which they are applied from slipping or skidding.

Another object of the invention is the provision of a device such as above referred to which will insure adequate gripping surfaces to allow the car to pull up slippery hills and the like or over snow and ice covered roads.

The invention as a further and more specific object contemplates the provision of a device of the above character embodying briefly a supporting base having integral side flanges shaped to form main and secondary cleats and carrying reinforcing members shaped to form seats for the retaining means for the flanges. A still further object of the invention is the provision of a tire chain for automobiles and the like, and in particular to tread attachments for the chain which will be comparatively simple and inexpensive to manufacture, reliable and efficient in use, and readily operated.

Figure 1:
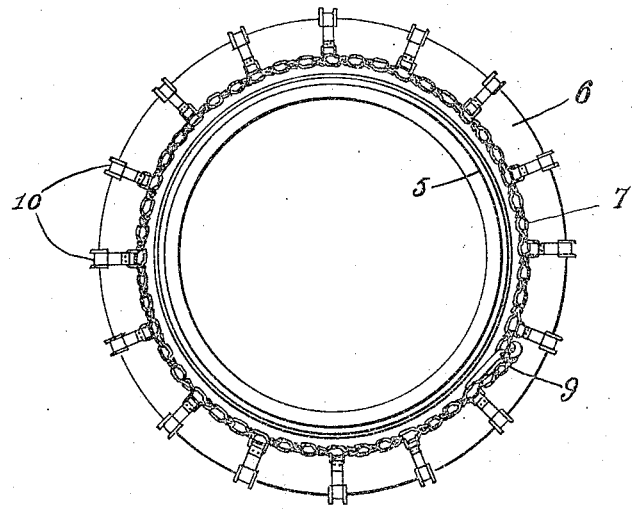
Figure 2:
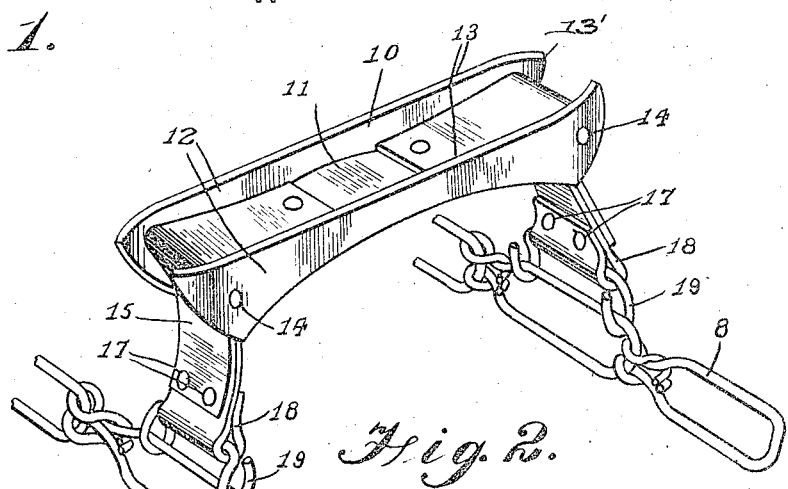
Figure 3:
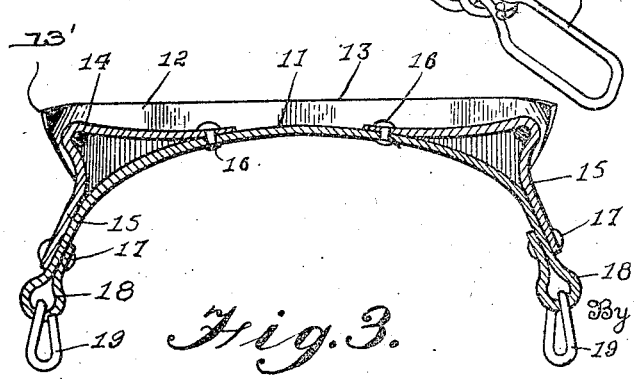

With the above and other objects in view, the present invention resides in the novel features of construction, formations, combinations, and arrangements of parts to be hereinafter more fully described, claimed and illustrated in the accompanying drawing forming a part of the present application; and in which, Figure 1 is a side view of the tire chain applied to the wheel of an automobile or the like;

Figure 2 is a perspective view of a portion of the chain with one of the tread members applied thereto; and, Figure 3 is a longitudinal sectional view taken through one of the tread members.

Referring now to the accompanying drawing by corresponding characters of reference throughout the several views, the numeral 5 designates in general the rim of an automobile wheel or the like which carries the usual tire 6.

My improved chain is shown at 7 and comprises a pair of side members 8 connected at their ends by suitable clamps 9 and supporting the tread members 10. These tread members 10 are of improved construction and each comprises a curved base 11, of substantially rigid sheet metal, having integral side flanges 12, the straight outer edges of which form main cleats 13 for engagement with the road to prevent the wheels from slipping, while the outer corners are pointed and bent slightly inwardly forming secondary cleats 13' for engagement with road or ground to the side of that engaged by the main cleats.

The base 11 is curved to conform to the curvature of the tire 6, while the side flanges 12 at their ends are connected by rods 14 which hold them in their proper spaced relation and prevent them from bending out of shape when in use. Reinforcing angle members 15 of strap metal are now employed and have their outer portions secured by fasteners 16 to the base adjacent the central portion thereof, being previously bent at their points of distortion to form seats for the rods 14, while the opposite portions are secured by rivets adjacent the free ends of the base 11 which latter has also been previously bent to form loops 18 for receiving hooks 19 which attach the tread members 10 to the links of the side members 8.

Any number of tread members 10 may be employed as desired, and it will be readily seen that when positioned in the manner shown in Figure 1 upon the wheel of an automobile or the like they will prevent the said wheel from slipping or skidding.

It is believed in view of the foregoing, that a further detailed description is entirely unnecessary. It may be added however, that stress is laid on the arrangement of the reinforcing members for both the base and its flanges, as well as the provision of the seats therein for the flange retaining bolts, this feature assuring rigidity and consequent durability.

From the foregoing description taken in connection with the accompanying drawing, it will be manifest that a tire chain is provided which will fulfil all of the necessary requirements of such a device, and it should be understood in this connection that various minor changes in the specific details of construction can be resorted to within the scope of the appended claims without departing from the spirit or sacrificing any of the advantages of the invention.

Having thus fully described the invention what I claim as new and desire to protect by Letters Patent is:

1. In a device of the character described, an arcuate supporting base, integral flanges thereon, reinforcing angle members carried by the base and formed with seats, and fastening members arranged in the seats and engaged in the flanges for retaining the flanges against the reinforcing members.

2. In a device of the character described, an arcuate supporting and attaching base, a pair of flanges integral with the opposite edges of the central portion of the base and shaped to form main and secondary cleats, reinforcing angle members secured to the outer surface and opposite sides of the base and contacted by the flanges and also formed with seats, and retaining rods arranged in the seats and engaged through the flanges for maintaining the flanges in contact with the edges of the reinforcing members.

3. In a device of the character described, an arcuate tire engaging and supporting base having attaching loops at its terminals, opposed side flanges integral with the main portion of the base provided with straight outer edges to form main cleats and having their outer corners pointed and turned slightly inwardly to form secondary cleats, reinforcing angle members secured to the outer surface and opposite sides of the base and bent at their points of distortion to form seats, and retaining members arranged in the seats and engaged with the flanges for maintaining the flanges against the side edges of the reinforcing members.

In witness whereof I have hereunto set my hand.

JOSEPH SIMON.